FIG. I

INVENTOR.
ANDREW GRUENWALD
BY Harry Price
ATTORNEY

INVENTOR.
ANDREW GRUENWALD
BY Harry Price
ATTORNEY

INVENTOR.
ANDREW GRUENWALD
BY Harry Price
ATTORNEY

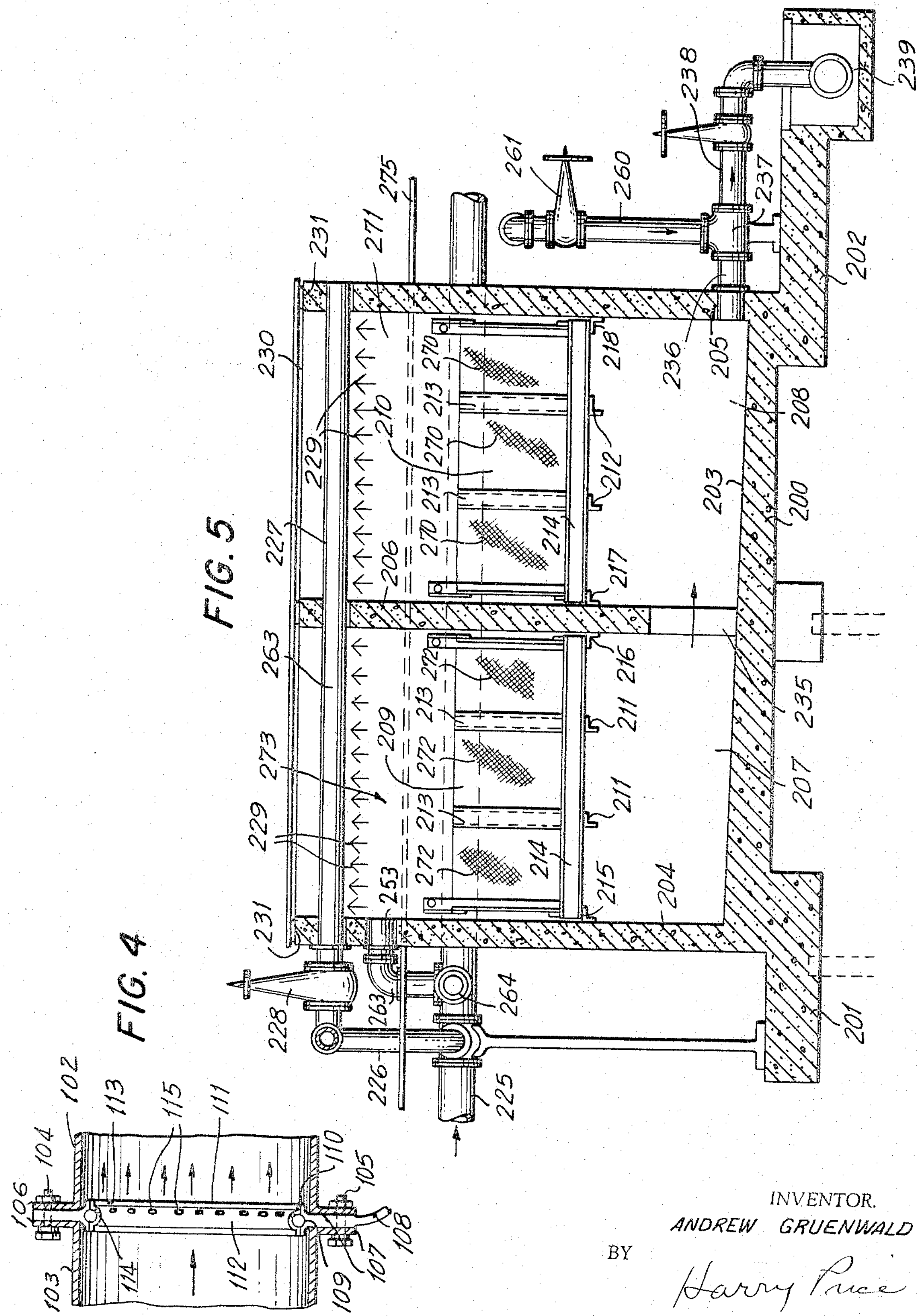
INVENTOR.
ANDREW GRUENWALD
BY
Harry Price
ATTORNEY

FIG. 6

INVENTOR.
ANDREW GRUENWALD
BY
Harvey Price
ATTORNEY

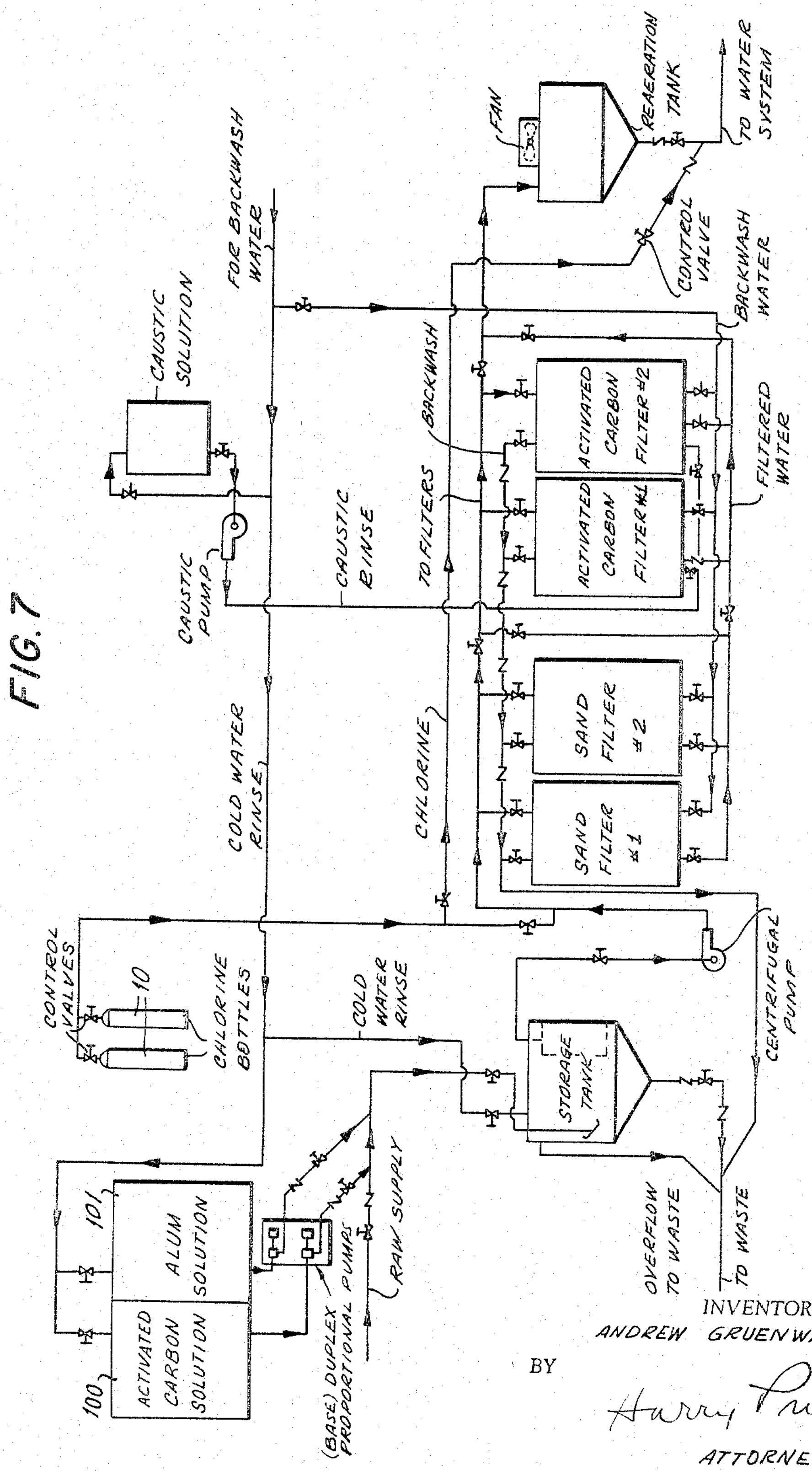
INVENTOR.
ANDREW GRUENWALD
BY
Harry Price
ATTORNEY 3,337,454

PRODUCTION OF POTABLE WATER FROM EFFLUENT SEWAGE AND POLLUTED WATER

Andrew Gruenwald, 8717 Marengo St., Hollis, N.Y. 11423

Filed Aug. 23, 1965, Ser. No. 481,767
3 Claims. (Cl. 210—51)

The present invention relates to the purification and renovation of water to be used for potable, sanitary and industrial purposes. Although not limited thereto, the present invention has the most particular application to the treatment of water for domestic household and industrial utilization, where it is derived from rivers, lakes or waterways which are relatively devoid of saline content.

It is among the objects of the present invention to process river, lake or waterway water, even when it may have a high sewage content, so that an effluent is produced which is substantially as good as or identical with purified, uncontaminated granite rock type run-off rain water.

Another object is to provide a rapid, inexpensive process for renovating aqueous sewage effluent so that the water may be re-used as purified water or even dumped into streams without contaminating the same.

A still further object is to provide a novel renovating system for non-saline sewage containing aqueous effluent so that it may be readily used for potable, sanitary and industrial purposes.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

To give a detailed procedure of the process according to the present invention, a pump or injector picks up the polluted water from rivers, lakes and waterways. The treatment may be preferably applied to the effluent from a sanitary plant or a sewage treatment plant.

The sewage effluent or polluted water is then mixed with the solution of alum and a slurry of powdered activated charcoal and then it is subjected to a quick settling process for less than six hours.

After sedimentation, the partially treated water is discharged into a storage tank and the balance of the liquid is discharged in the waste system, where it may be picked up and recirculated.

From the primary treatment storage tank, the water is picked up by a second series of pumps and discharged into a series of gravity or pressure cells for primary filtration. The gravity or pressure cells are so designed that they may be backwashed at intervals as required without interfering with the normal operation of the filter process.

If desired, additional sterilization and bacteria control may be applied. The entire operation is a continuous one. Finally, from the primary treatment, pumps pick up the treated water and discharge it into the secondary chemical purification treatment cells which are operating under a predetermined pressure.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a diagrammatic transverse sectional view indicating the chemical feed arrangement.

FIG. 5 is a diagrammatic vertical transverse sectional view showing the treatment section, with its separable and independent containers or baskets.

FIG. 6 is a diagrammatic transverse sectional view showing a building with the equipment in position therein and a number of the inventions of this unit in position therein.

FIG. 7 is a diagrammatic layout of a complete system showing the various stages in the recovery procedure.

Then the liquid passes into the storage tank S after prime treatment, from which it is supplied by the pumps T to the second stage purification tanks U, where it may be subjected to caustic treatment.

After the secondary treatment and purification, it goes to the storage tank V and then is picked up by the pumps W, which feed it to the reaeration tanks X.

The pumps Y then feed it to the water supply Z as purified water. This diagrammatic layout is shown in FIG. 7.

Figure 1:
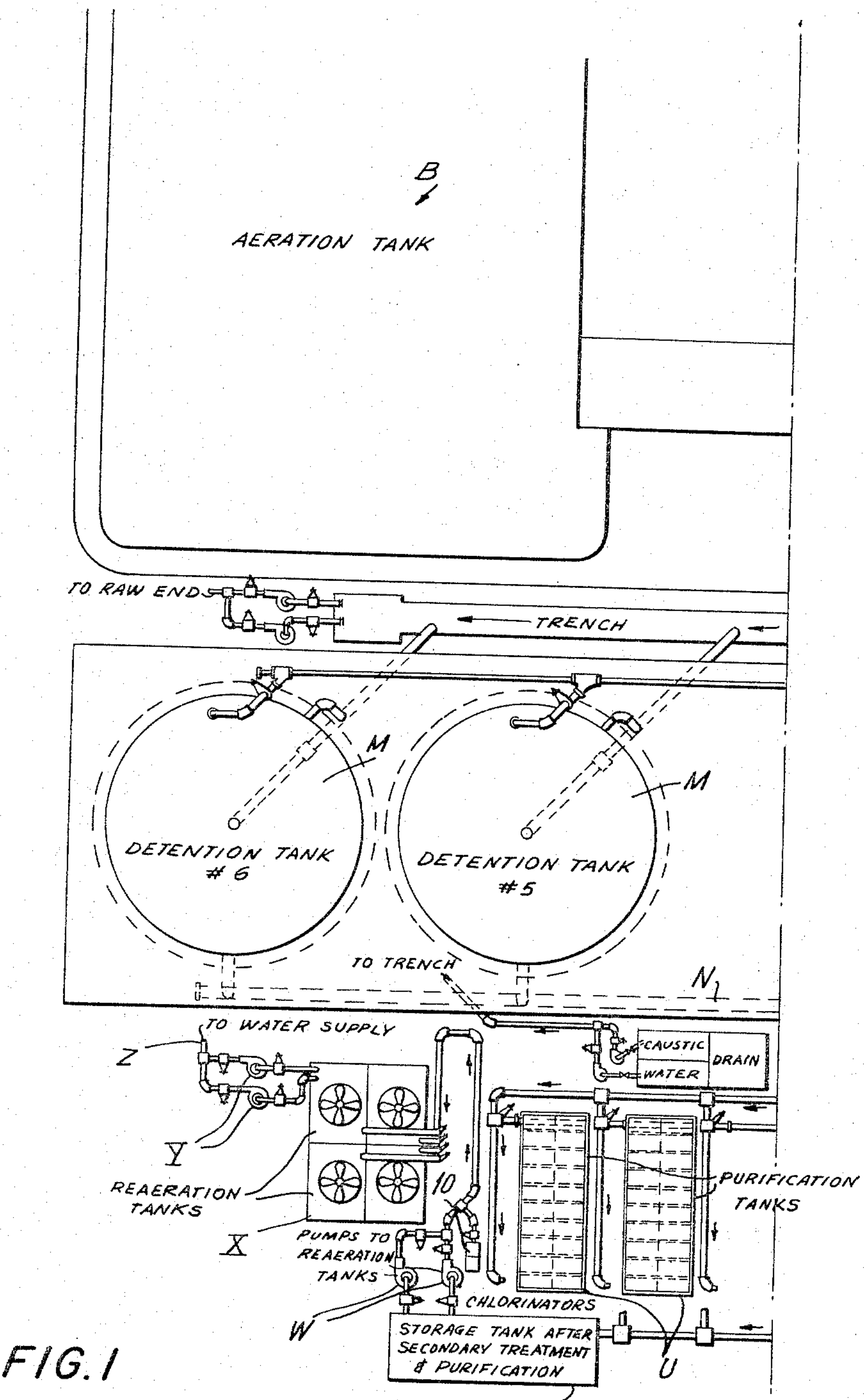
FIG. 1 is a fragmentary portion of the left side of a diagrammatic recovery system according to the present invention.
Figure 2:
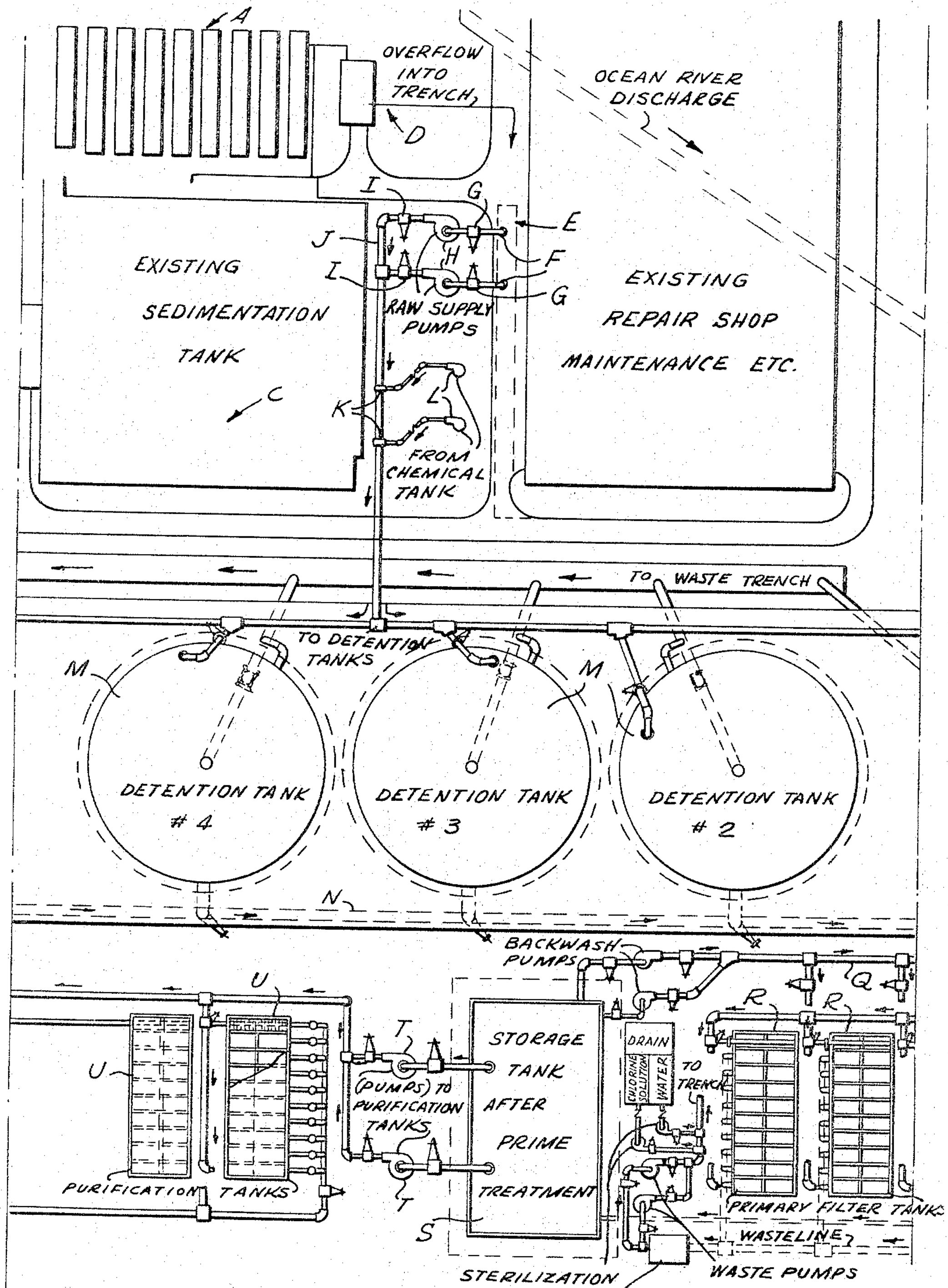
FIG. 2 is a diagrammatic showing of the middle portion of a recovery system.
Figure 3:
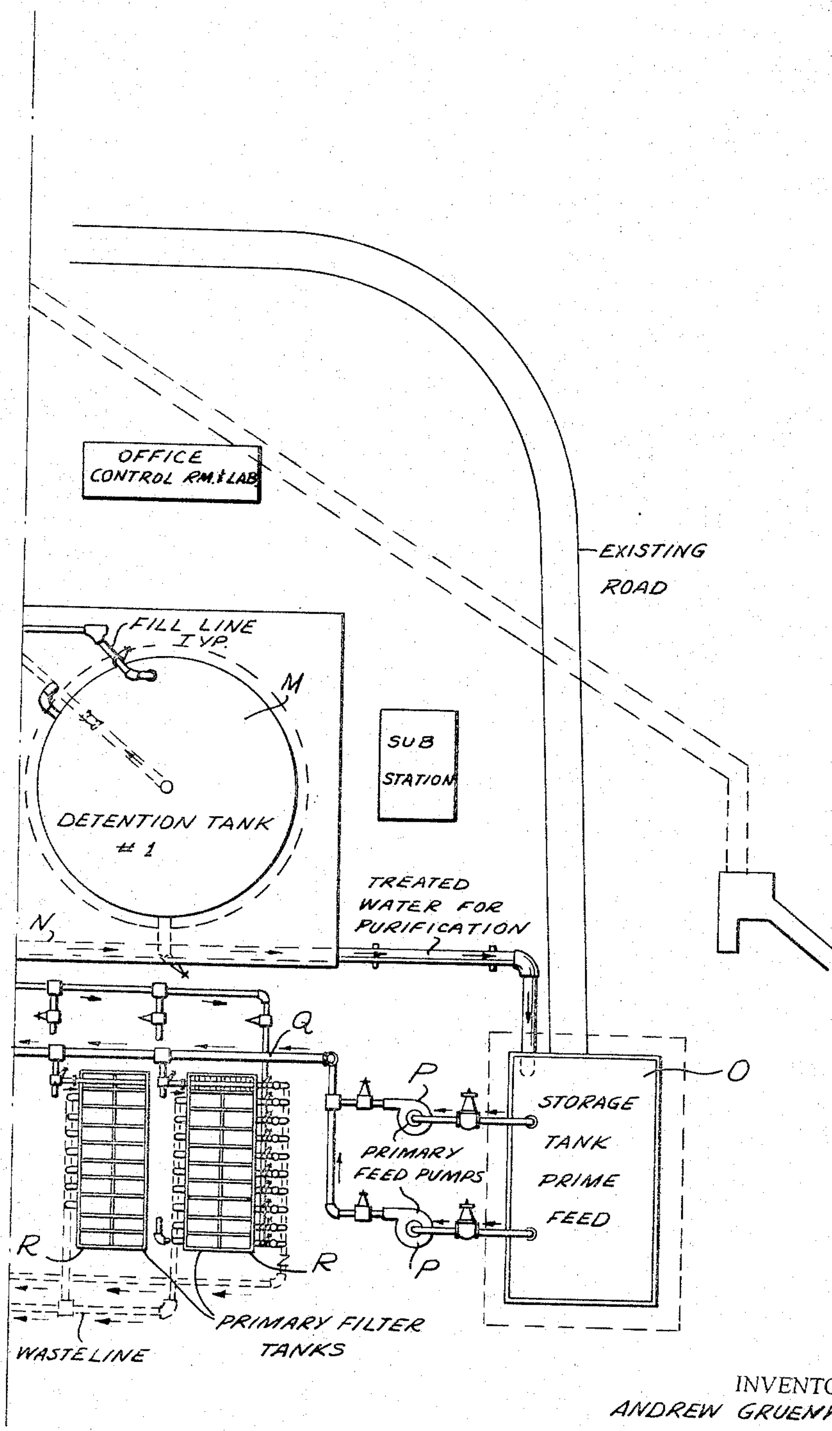
FIG. 3 is a diagrammatic showing of the right side of the recovery system.

In FIGS. 1, 2 and 3 the chlorinators 10 are shown.

Desirably, each cell is removable and when removed may be subject to a chemical purification process, rerinsed with clean water, and placed back into service without interfering with the continuous flow of the system. The discharge from the purification cells or batteries is passed into a storage basin for use as secondary treatment and purification receiver. The water out of the purification receiver is then forced by a fourth series of pumps into a pipe system where the water is chlorinated for bacterial control and destruction.

The final phase is the reaeration, from which phase the water is then discharged for use as clean water.

The initial raw material for the water purification and recovery system may be the effluent of a sewage disposal plant or any suitable and convenient river, lake or waterway in which the water may be contaminated by sewage or otherwise soiled, but not contaminated by salt. Normally, such effluent is discharged into a trench. Where the trench does not exist, some channel should be provided.

In the normal procedure, the liquid from this trench is discharged into the ocean or river, after further treatment to meet government standards.

However, in the present process, two pumps pick up the effluent from the trench or channel and then discharge it. Into the discharge from the pump there is injected treating chemicals, such as powdered carbon and alum, the proportion of which is regulated by the contamination of the water.

The cells also must be sterilized against bacteria. This sterilization may be accomplished with a special backwashing. The cells normally are sterilized by leaving them out of their units and first placing them in a highly chlorinated liquid until all bacterially controlled substances or bacteria are destroyed. The algae which collect can only be removed by a chlorination process. These algae are thoroughly destroyed by the high chlorine treatment provided by the aqueous cleaning when they are removed from their position in the main cell. Then the baskets may be readily re-used again by being pushed back or placed in the filter unit. This will produce a clean water, but not sufficiently purified for drinking purposes.

In stage two of the purification process, which is an after secondary treatment and purification, the liquid is passed through a similar set of cells but without relying upon gravity flow, since for this second set of filter cells the liquid is forced through under a pressure of 25 to 75 pounds.

In this secondary treatment and purification operation there also are used a plurality of purification tanks containing a large number of removable screen baskets or cells. These cells are removable and may be treated for renovation or reclamation by caustic soda of, for example, 5% concentration, which appears to be most effective in enabling the granulated carbon or particle carbon to act upon the liquid without being clogged by the slime or other deposits thereon.

In the first step the sewage effluent or polluted water containing the powdered carbon or alum is then passed to detention tanks which may have a capacity of 1,600,000 gallons by way of example, but which tanks may have any size suitable to the plant. In these detention tanks the detention time and the discharge time will total 6 hours, but this is flexible and may vary above or below 6 hours and may be as low as two hours.

The detention tanks will permit a settling of the material so that the upper layer, which may be 60 to 80% of the total, may be discharged in the water main, and the scum may be dischargeable into a waste trench.

The upper layer is discharged into a storage tank or prime feed, from which it is drawn by one or more feed pumps and fed by pressure or gravity into primary filter tanks. Each primary filter tank will be a series of removable cells, each of which wil have a removable basket of stainless steel mesh of 20 to 40 mesh.

From the filter tanks the liquid is passed to the second storage tank, which is after the filter treatment. Provisions are made for automatic or manual backwash of the cells so that selected cells may be continually backwashed without affecting the continuity of the process of the second cells.

This activated carbon is found to have its activity increased many times the removal of the film or slime or scums which impede its action. For example, it has been found that with the series of columns as shown in FIGS. 1, 2 and 3 where the carbon was merely wetted with water, the slime, scum and film was not removed and the carbon had very little effectiveness. On the other hand, when even a small amount of caustic soda was used, up to 2 to 5%, the film, slime and scum were readily removed and the activity of the carbon was substantially restored to its original condition.

Government regulations provide that synthetic detergents cannot exceed .5 p.p.m. For example, with the present application at a pH of 6.8, starting off with a detergent in the amount of 4.3 p.p.m., the activated carbon of the present application reduced this down to 0.12 p.p.m., whereas, the pH was increased from 6.8 to 6.9.

The discharge from the secondary treatment and purification operation is then chlorinated in accordance with the requirements, which may vary from 2 p.p.m. to 10 p.p.m. depending upon the condition of the purified liquid at this stage. From the chlorination, the purified liquid is now passed to a reaeration system where the liquid is reaerated and the excess chlorine practically removed. After reaeration, the liquid is discharged into storage tanks from where it may be fed to the city water supply or to the industrial supply or to other use and it is the same as clean fresh water.

Referring to the succesive junctions 100 and 101, these are where the chemicals are added, powdered carbon being added to the flowing liquid at 100 in an aqueous dispersion slurry and aluminum sulfate or alum being added at 101 in solution. This arrangement is shown in greater detail in FIG. 4, where the two sections of pipe 102 and 103 are joined by the bolts 104 and 105 passing through the flanges 106 outstanding from the pipe sections 102 and 103.

In between the flanges 106 is clamped the hollow disc member 107, which has a feeder inlet 108 through which is fed in either an aqueous dispersion of powdered carbon or the solution of aluminum sulfate or alum.

The element 107 carries an encircling or peripheral half cylindrical conduit member 109 with an outstanding flange 110. To this cylindrical flange is mounted the flange 111 of the other grooved member 112, with the flanges 113 and 111 being welded together or attached by bolts. This will form a continuous passageway around the interior of the periphery of the junction between conduit sections 102 and 103.

The upper conduit section 114, formed in the upper section 112, has a series of small openings 115 cut or drilled therein to regulate the effluent and assure equalization thereof around the periphery of the structure 112–114. This will assure an adequate feed of the desired chemicals, both at position 100 and at position 101.

Basically, the present system as shown in FIGS. 1, 2 and 3 may be associated with a sewage disposal plant or river, lake or waterway A containing contaminated water.

In addition, there may be an aeration tank B and a sedimentation tank C in connection with said system.

The waste water will overflow at D into a trench E and from the trench E will be picked up by the dip-tubes F, having the valve controls G.

The pumps H serve as the raw supply pumps and they force the picked up liquid past the valves I into the header J, past the chemical inlets K. These chemical inlets K are suplied from the pumps L from a chemical tank and they will feed in powdered carbon, powdered alum and other purifying chemicals in amounts controlled by the impurity of the water.

The valves L will control feed of chemicals through chemical inlets K, which are shown in greater detail in FIG. 4.

The header J feeds the detention tanks M, each of which may have a capacity of 1 million to 2 million gallons and which will usually hold the chemicals in water for a period of 4 to 8 hours. Then the treated liquid is discharged into the header N and passed to the storage tank and prime feed O. From the storage tank O, it is drawn by the pumps P and forced into the header Q, from which it passes into the primary filter tanks R.

To give a detail showing in respect to the primary and secondary treatment and the basket or container construction utilized, reference is had to FIG. 5. In FIG. 5 is shown a concrete foundation 200 having the downwardly extending ground or floor support members 201 and 202 and a sloping interior floor 203 inside of the walls 204 and 205 and the separating wall 206.

The walls 204, 205 and 206 form the chambers 207 and 208 into which fit the removable baskets or containers 209 and 210 or other filtering containers which have screened sides and bottoms as indicated. These screened filtered members are supported by the lower angle cross section structure members 211 and 212, by the side view cross section members 213 and by the corner base members 214. The lower members 214 are mounted on the walls by the end angle members as indicated at 215, 216, 217 and 218.

As indicated in FIG. 5, the supply enters through the conduit 225 and the water to be purified passes upwardly at 226 to the header 227, past the valve 228. The header has a series of openings 229 permitting the effuent to flow down into the interior of the baskets.

The pressure plate 230 will be bolted or otherwise fixed on the upper ends of the side walls 204 and 205 and the center wall 206 to form a cover for the pressure system.

The liquid passing down through the screened basket or containers flows in the chamber 207 and 208 and through the opening 235 in the central wall 206 and then down through the conduit 236. The conduit 236 leads to the two way junction 237 which permits the liquid to flow as indicated at 238, down to the prime storage treatment or first stage filtering at 239, where it will go into the storage tank after prime treatment as shown in 203.

When it is desired to clean the structure or cell or cells, water may be passed back under pressure from the conduit 260 past the valve 261, into the T-head 237 and back into the two chambers or cell or cells 207 and 208 to cleanse the baskets or containers. In case of overflow, this is taken care of by the conduits 253 and 263 which feed the outlet 264. From thence it flows into the waste line.

The baskets or containers 272 in the second section 273 may be withdrawn at intervals from the frame as shown in FIG. 5 and thoroughly cleansed and sterilized.

It will be noted that there is a platform 275 on the outside of the structure to permit an attendant to walk along and supervise the apparatus.

Although the dimensions may vary widely, the structure as shown may be 10 to 20 feet high and 30 to 100 feet long. The chambers or cells may vary in number and normally each chamber may consist of two screen filtering units positioned side by side. The filter media may vary but it is desirably screened or in screened sand, desirably having the fineness of 100 mesh or larger. It is also possible to use finely ground anthracite coal called Anthrofil which has about the same particular size as the sand.

Figure 6:
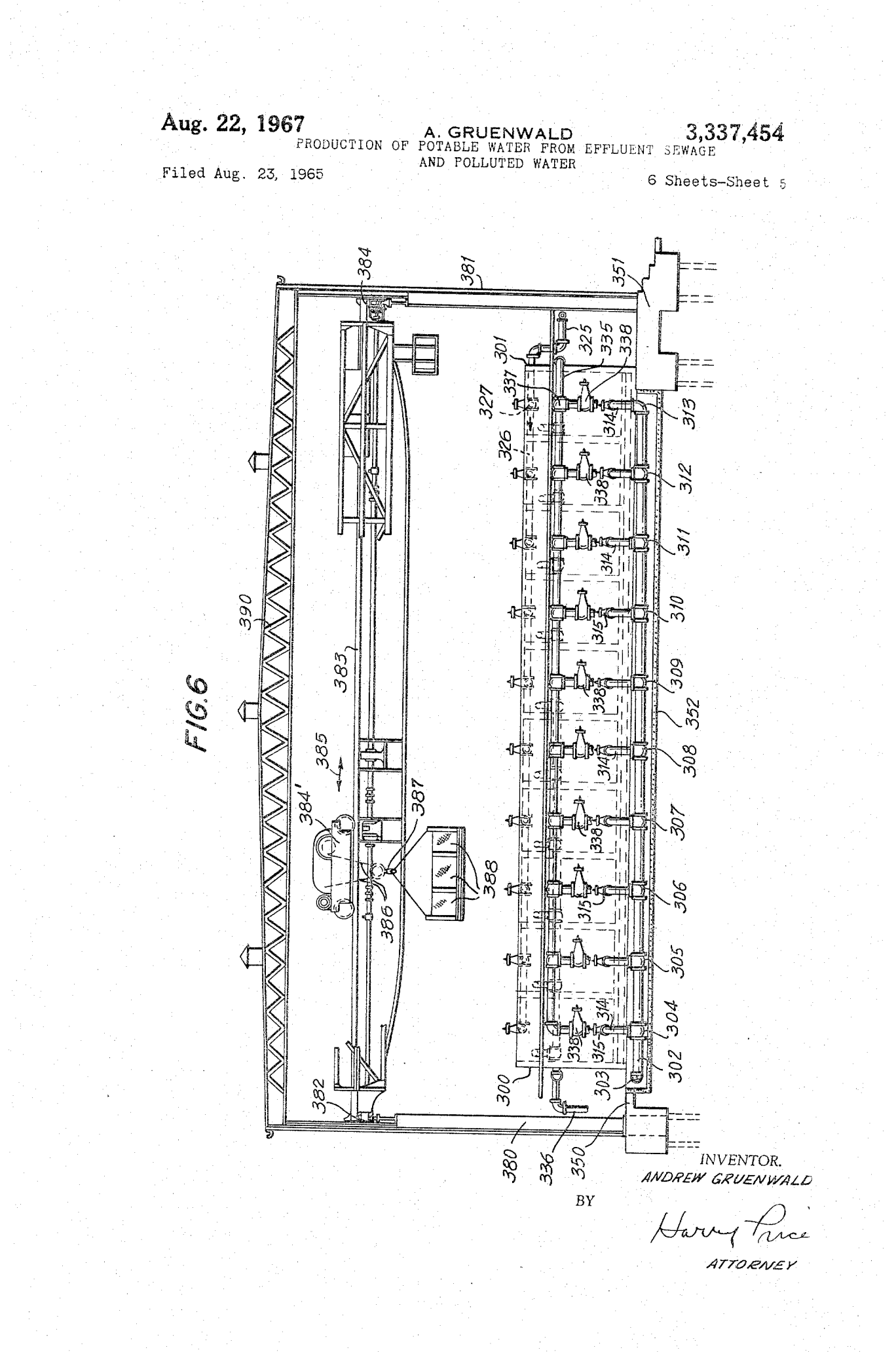

In FIG. 6 there is shown a complete plant within a complete structure, in which there are by way of example ten double units or cells shown side by side extending from the wall 300 to the wall 301 and having a common outlet connection 302 with an elbow 303 and having the numerous T-connections 304, 305, 306, 307, 308, 309, 310, 311, 312 and 313. These T-connections are connected to the vertical pipes 314 and valves 315 to receive the purified effluent from the tank or chamber below the baskets.

The water to be purified flows in at 325 into the common header 326, past the valves 327. In case of backwash or cleansing, the header 335 is used with an outlet 336 to the sump. This header 335 has the T-connections 337 to the valve connections 338.

The entire assemblage of units is mounted upon the concrete structure 350 and 351 and there is a trench 352 provided to receive the conduit or header 302 for the filtered water.

The walls of the building as indicated at 380 and 381 are also mounted on the structure 350 and 351 and they carry the beamed structure 382, 383, and 384, by means of which a crane trolley 384' may pass from wall to wall in either direction as indicated by the arrow 385. The crane trolley 384' has a depending cable 386 to the pulley 387 which carries the baskets, containers or screen filters 388 to be cleansed. Each one of these units 388 may be the same as the unit 272 shown at the left of FIG. 5 or 270 shown at the right of FIG. 5. By means of this crane and trolley it is possible readily to replace the removed units or cells or to remove them for cleansing or sterilization.

The roof 390 may be of conventional construction.

In the first stage, sand is employed as a filtering agent, but in the second stage granulated activated carbon may be utilized, primarily for purification.

It will also be realized that after the primary filtration with sand, the secondary purification with activated granulated carbon, the effluent is subjected to re-aeration before it is finally used for potable water supply.

Having now particularly described and escertained the nature of the invention, and in what manner the same is to be performed, what is claimed is:

1. A process of producing potable water from non-saline sewage effluent and contaminated water which consists essentially of injecting thereinto a dispersion of powdered activated carbon and a solution of alum, causing settling and sedimentation, decanting the water after settling and sedimentation, passing the water through a bed of highly chlorinated sand and then passing the water under pressure through a bed of caustic treated granular activated carbon, then chlorinating and re-aerating to obtain a potable water suitable for human consumption.

2. The process of claim 1 in which the water is forced through the bed of granulated carbon under a pressure of 25 to 75 pounds, said granulated carbon having been treated with 5% aqueous caustic soda.

3. The process of claim 1, said settling and sedimentation taking place over a period of four to eight hours.

References Cited

UNITED STATES PATENTS

| | | | |
|---|---|---|---|
| 2,605,901 | 8/1952 | Morrison et al. | 210—282 |
| 2,633,990 | 4/1963 | Simpson et al. | 210—282 |
| 3,171,802 | 3/1965 | Rice et al. | 210—53 X |
| 3,171,804 | 3/1965 | Rice | 210—80 X |
| 3,252,899 | 5/1966 | Rice et al. | 210—75 X |

OTHER REFERENCES

Fairrie, G., Sugar, first edition, 1925, Fairrie and Co., Ltd., Liverpool, pp. 79, 80, 119, 120 and 128 relied on.

Nordell, E., Water Treatment for Industrial and Other Uses, 1951, Reinhold Publishing Corp., New York, pp. 177, 184, 287 and 311–315 relied on.

MORRIS O. WOLK, *Primary Examiner.*

MICHAEL E. ROGERS, *Examiner.*